UNITED STATES PATENT OFFICE.

JAMES W. C. HAMILTON, OF LIVERPOOL, ENGLAND, ASSIGNOR OF TWO-THIRDS TO THE BERGL AUSTRALIA, LIMITED, OF SYDNEY, NEW SOUTH WALES.

PROCESS OF MAKING FOODS FROM BLOOD.

SPECIFICATION forming part of Letters Patent No. 653,956, dated July 17, 1900.

Application filed May 15, 1899. Serial No. 716,898. (No specimens.)

*To all whom it may concern:*

Be it known that I, JAMES W. C. HAMILTON, a subject of the Queen of Great Britain, residing at Liverpool, in the county of Lancaster, England, have invented certain new and useful Improvements in the Manufacture of Foods from Blood, of which the following is a specification.

This invention has for its object the utilization of the blood from slaughter-houses in such a manner as to produce a wholesome and nutritious food therefrom.

The fresh-drawn blood, filtered, if required, to extract any impurities, is mixed with one per cent. (1%) of salt, stirred in before or after said filtration. It is then carried to an autoclave. Steam-pressure to the extent of one hundred and fifty pounds is now applied to bring it to a temperature of about 340° Fahrenheit. This pressure is applied for two to five minutes. In general I find two minutes is sufficient. The blood is now withdrawn from the autoclave and canned or bottled hot and cooled as quickly as possible. It is not necessary, however, to can it or bottle it unless it is required to be kept for a considerable time. The blood will now remain liquid and can be used as a food by itself or mixed with tea, coffee, cocoa, solutions of hypophosphites of soda, lime, or iron and with or without the addition of malt extract of high diastasic power. It may also be mixed with aerated or mineral water or with alcohol, sugar, molasses, or the like and aerated with carbonic acid or otherwise. Special flavors of any desired kind can be added. If it be used for food for cattle or for other animals, extract of linseed, linseed-oil, fat, oil, or bone-marrow can be added, or the blood can be mixed in varying proportions with treacle, starchy or albuminous matters, cereals, ground oil-seeds, nuts, nut-kernels, desiccated malt, powdered spices and carminatives, and other matters now used in cattle-foods and fattening-foods for other animals or birds. It will be very useful for forcing eggs and for poultry-meal generally.

In heating the blood I have found that when an iron retort or autoclave is used the color is injured. I therefore prefer to use silver-lined or silver autoclaves.

I claim as my invention—

The process of manufacturing food from blood which consists in taking the whole blood, as it flows from the animal, adding about one per cent. of salt and exposing it to heat and pressure in a closed vessel at a temperature of about 340° Fahrenheit, for a sufficient period to preserve it permanently against coagulation, as herein described.

In witness whereof I have hereunto signed my name, this 20th day of January, 1899, in the presence of two subscribing witnesses.

JAS. W. C. HAMILTON.

Witnesses:
 JOHN MCLACHLAN,
 ALBERT C. B. HENRI.